Figure 1:
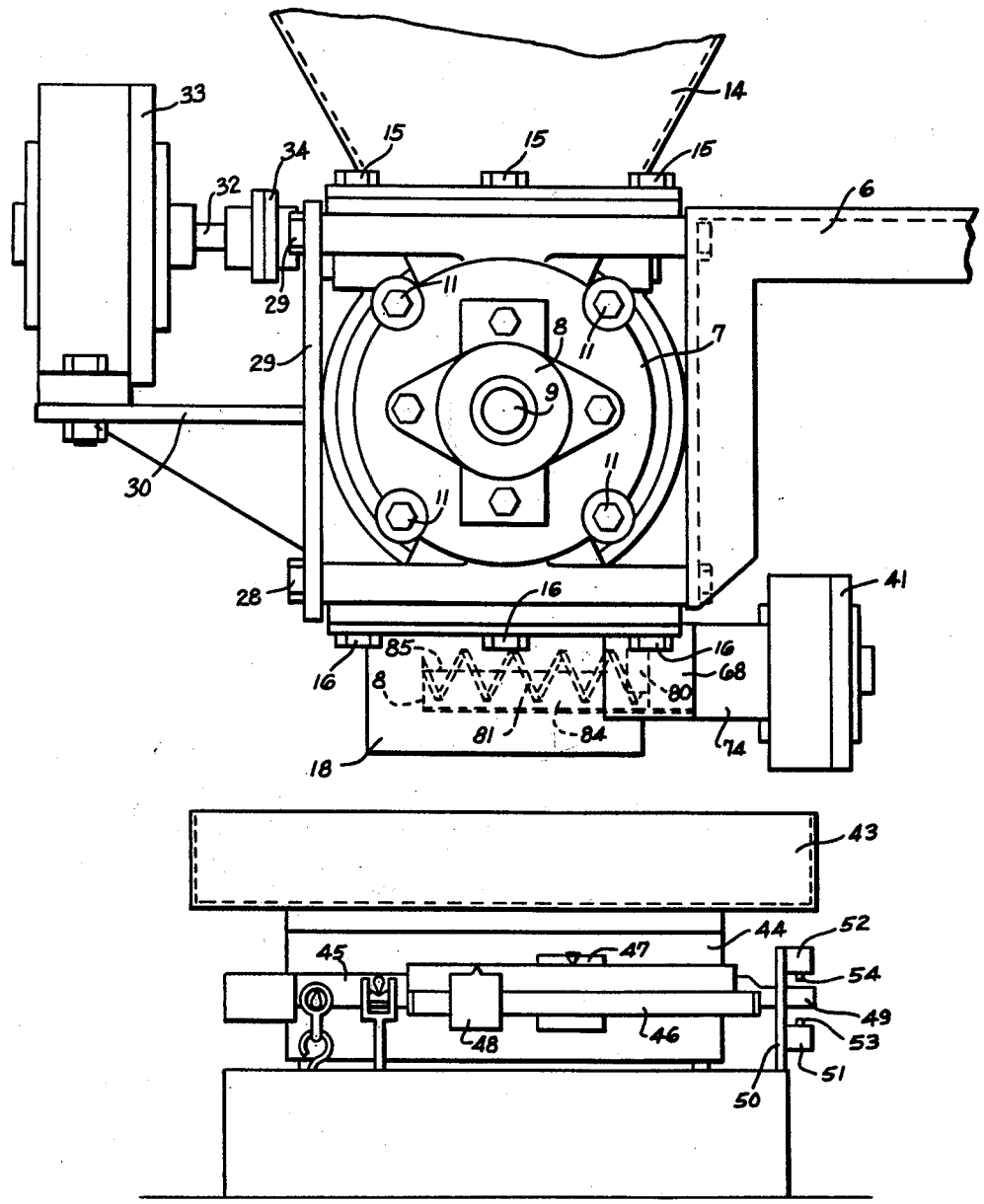

May 11, 1965

W. H. FRAZEL 3,182,738

GRAVIMETRIC FEEDER

Filed Sept. 10, 1962

4 Sheets-Sheet 1

INVENTOR.
WILBUR H. FRAZEL

BY Alfred R. Fuchs

ATTORNEY

May 11, 1965 W. H. FRAZEL 3,182,738
GRAVIMETRIC FEEDER
Filed Sept. 10, 1962 4 Sheets-Sheet 2

INVENTOR.
WILBUR H. FRAZEL
BY
Alfred R. Fuchs
ATTORNEY

INVENTOR.
WILBUR H. FRAZEL
BY
Alfred R. Fuchs
ATTORNEY

United States Patent Office 3,182,738
Patented May 11, 1965

1

3,182,738
GRAVIMETRIC FEEDER
Wilbur H. Frazel, East Providence, R.I., assignor to The New York Air Brake Company, a corporation of New Jersey
Filed Sept. 10, 1962, Ser. No. 222,439
10 Claims. (Cl. 177—120)

My invention relates to gravimetric feeders, and more particularly to a feeder of the batch type, in which the amount of material fed is controlled by the weight of material deposited in a receptacle by the feeding mechanism.

It is a purpose of my invention to provide a feeding device of the above mentioned character that very accurately delivers the quantity of material that is to comprise one such batch. In order that such feeding of a material into a receptacle can be accomplished at a relatively rapid rate and terminated when the weight of material in the receptacle reaches a predetermined value, I provide a main feeder that feeds the material to the receptacle at a high rate of feed and a supplemental feeder that feeds the material to the receptacle at a much lower rate of feed, and controlling means for said feeders, whereby the high rate feeder will be halted in its operation before the weight of material in the receptacle reaches the desired quantity, and additional material will be fed into the receptacle by means of the supplemental feeder during a short additional period of operation thereof to bring the total to the exact weight of material desired to be deposited in the receptacle.

It is a purpose of my invention to provide a feeding device of the above mentioned character, which is simple and inexpensive and does not require a source of supply of material for the supplemental feeder other than that supplying the material to the high rate or main feeder mechanism. In order to accomplish this purpose, my invention comprises a supply chamber or hopper supplying the material to the main or high rate feeder, which feeder simultaneously discharges into the receptacle and into the low rate or supplemental feeder so that said supplemental feeder will be fully charged at the time that feeding by the main feeder is halted.

The supplemental feeder has a relatively low feed rate so that high accuracy of the final batch can be attained, and is aptly referred to as a "dribble" feeder. However, the stopping of the main feeder must occur late enough in the feed cycle so that the charged supplemental feeder will contain sufficient material to complete the batch.

More specifically my invention comprises a main feeder, preferably of the rotary type, that is located above the receptacle to which the material is to be supplied and discharges material downwardly toward said receptacle, and a supplemental feeder, which is preferably provided with a material receiving chamber in the path of the material discharged from the main feeder, and provided with a feed screw that operates in said receiving chamber to discharge material therefrom into the receptacle. My invention comprises a supplemental feeder having a material receiving chamber that receives material from the rotary feeder, which chamber is U-shaped in cross section, or semi-cylindrical in cross section, and in which the feed screw operates, said semi-cylindrical chamber being arranged with its open side uppermost so that part of the material discharged from the main feeder is discharged into said receiving chamber.

It is a further purpose of my invention to provide means for feeding a predetermined weight of material to a receptacle, comprising a main feeder and a supplemental feeder of the above referred to character, in which both feeders discharge into the receptacle and in which

2 the supplemental feeder receives its material from the main feeder, and means responsive to the weight of material in the receptacle controlling the operation of both of the feeders so as to discharge material from both feeders into said receptacle for a period from the starting of the feeding operation until the predetermined weight of material in the receptacle is approached, and from only the supplemental feeder into the receptacle from then until the predetermined weight is reached.

By providing a supplemental feeder that has a material receiving chamber of the above referred to character mounted so that a portion of the discharge stream from the main feeder is deposited therein, and providing a feed screw therein that is continuously operating, the supplemental feeder provides what is the equivalent of a moving platform for the material deposited in the same, which tends to keep the supplemental feeder free of an excessive amount of material, such as might accumulate on a stationary platform, and thus prevents building up of material in the receiving chamber of the supplemental feeder to the angle of repose of the material. This is objectionable, as, if the material is permitted to build up in this manner it could hang there for a period of time, and then, even after the supplemental feeder has been cut off, some of the material could drop off into the receptacle and prevent the batch that has been deposited in the receptacle from being of the proper weight.

Other objects and advantages of my invention will appear as the description of the drawings proceeds. I desire to have it understood, however, that I do not intend to limit myself to the particular details shown or described, except as defined in the claims.

Figure 2:
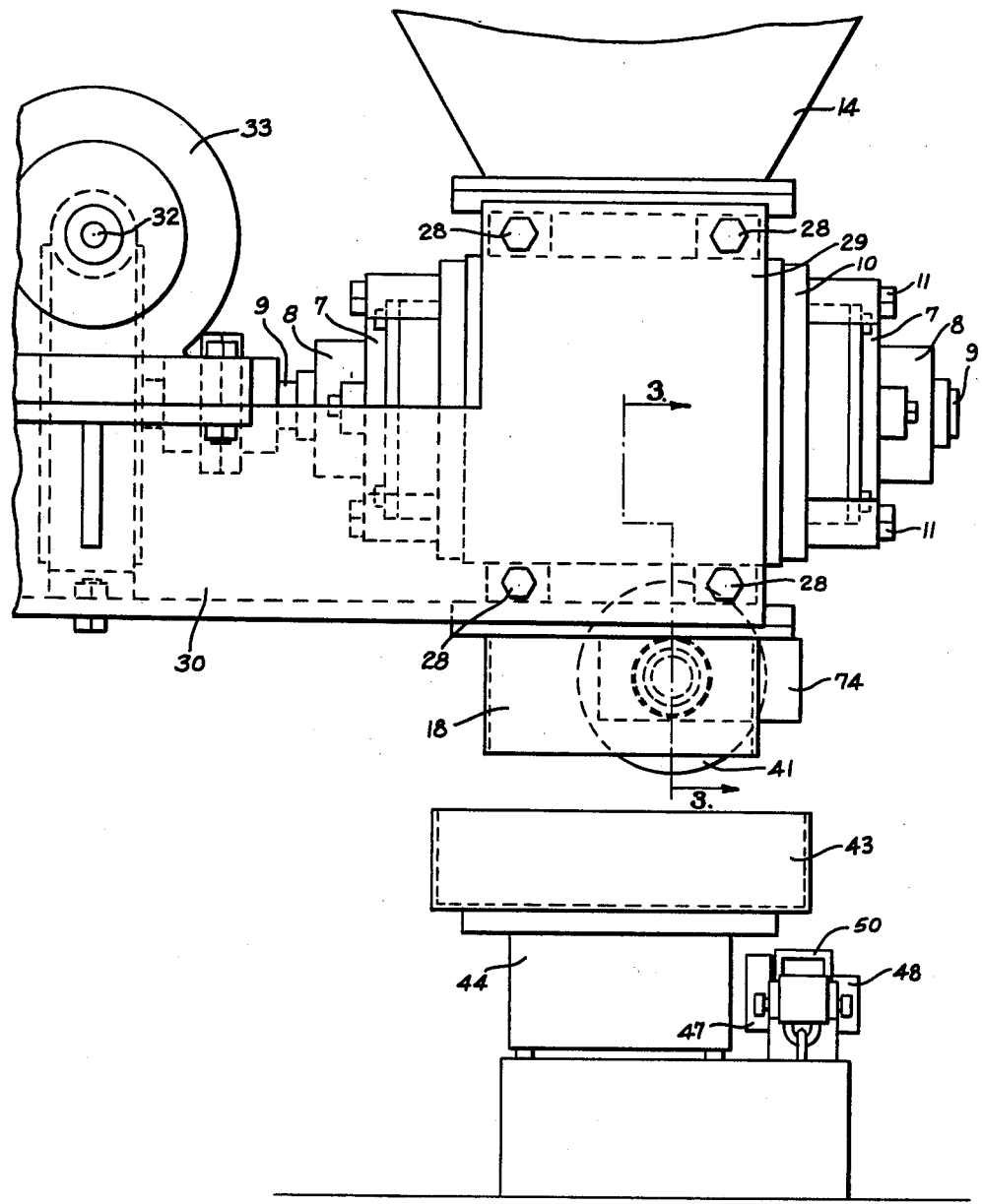
Figure 3:
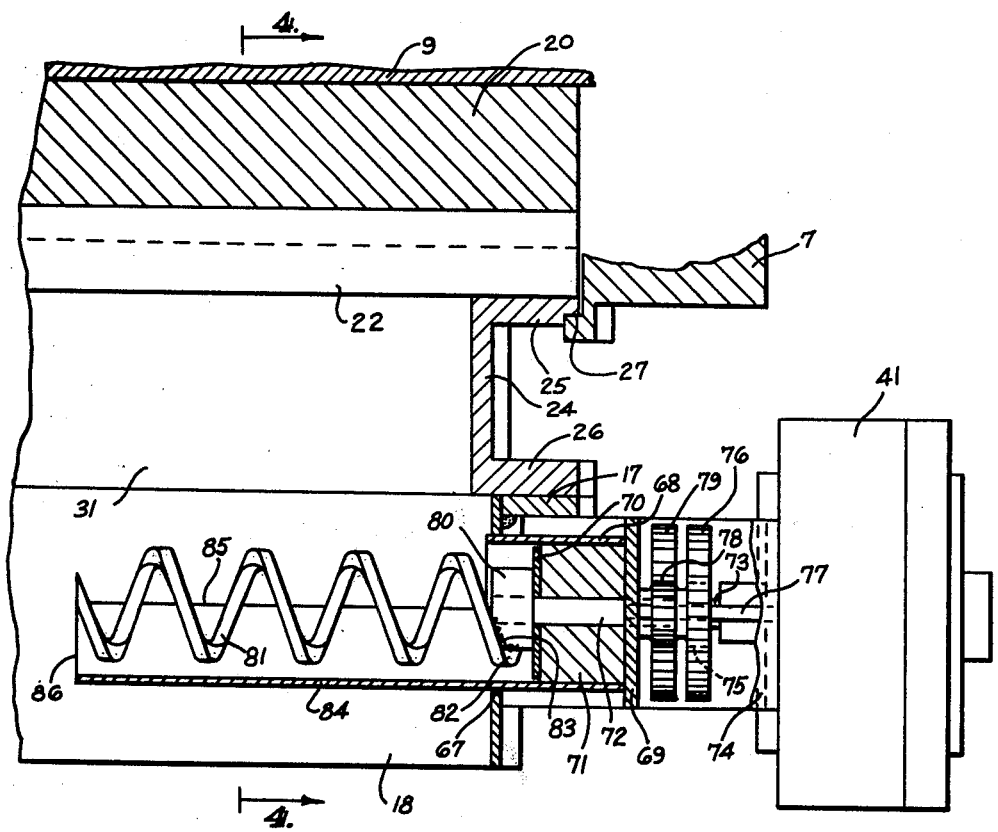
Figure 4:
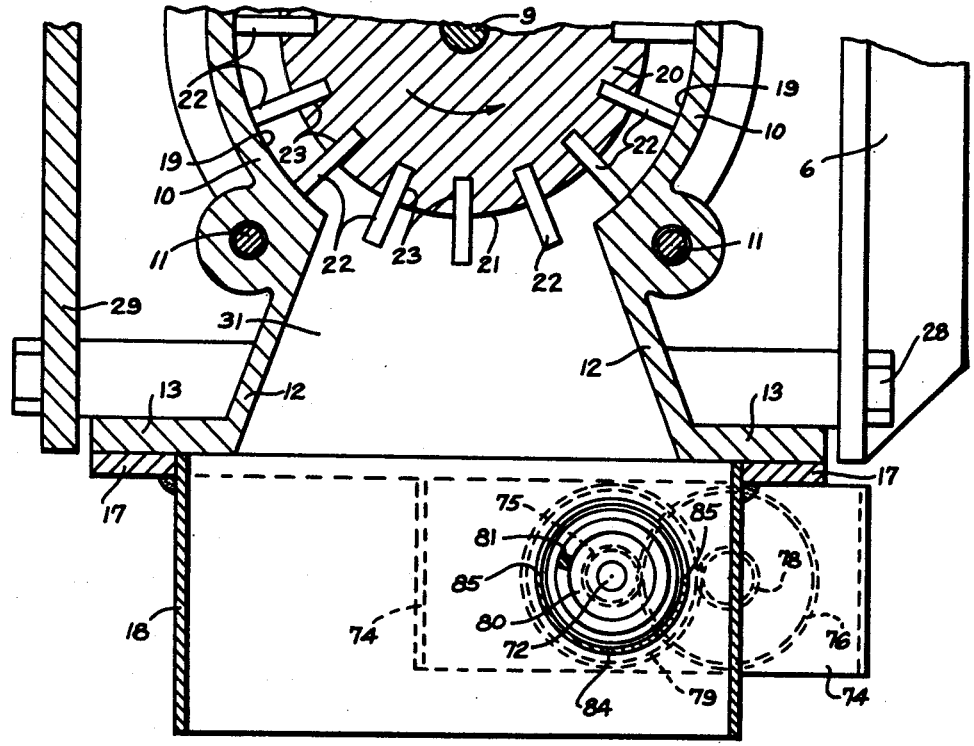
Figure 5:
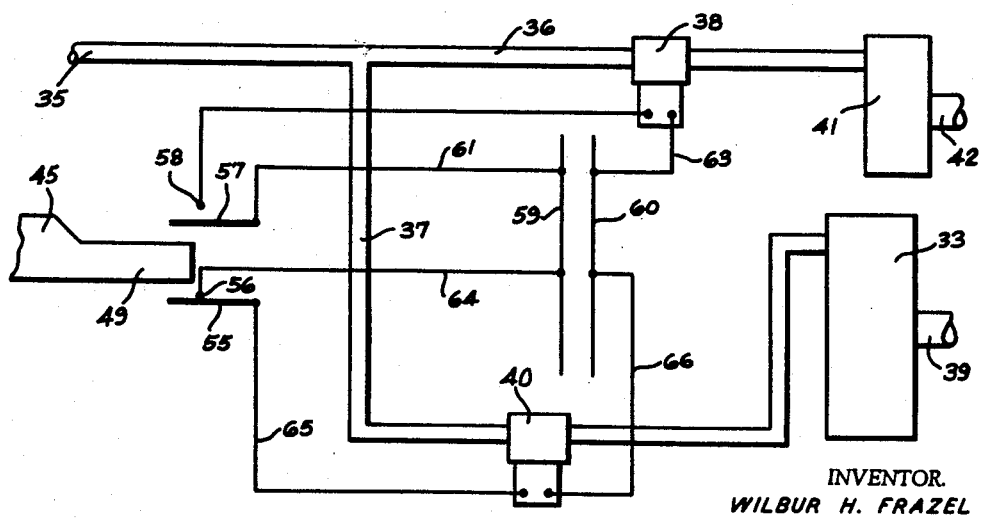

In the drawings:
FIG. 1 is a view in elevation of my improved feeding device partly broken away.
FIG. 2 is a similar view taken at right angles to FIG. 1.
FIG. 3 is a fragmentary sectional view taken on the line 3—3 of FIG. 2.
FIG. 4 is a fragmentary section taken on the line 4—4 of FIG. 3, and
FIG. 5 is a diagrammatic view showing the circuit connections provided for controlling the feeding device.

Referring in detail to the drawings, in FIG. 1 is shown a portion of an angular frame member 6, on which is mounted the housing of a rotary feeder having the end members 7, which are provided with bearing members 8 for a shaft 9, said end members being clamped to the main body portion of the feeder housing having an arcuate wall portion 10 clamped between the same by means of bolts 11. Said body portion also has a pair of flaring walls 12 extending between the end members 7 and terminating in horizontal flanges 13. Similar diverging wall portions are provided at the upper end of the housing leading into the space between the arcuate wall portions 10 from a hopper 14, which is secured to the top flanges of the body portion by means of headed fastening elements 15. Headed fastening elements 16 are provided for securing the flanges 17 on a discharge spout 18 to the body portion of the main or high rate feeder.

Said main or high rate feeder accordingly has a cylindrically curved concave surface 19 curved about the axis of the shaft 9 and thus the housing is provided with a feed chamber, the main portion of which is cylindrical with its axis horizontal. Mounted on the shaft 9 to rotate therewith is the body portion 20 of a rotary feeding member, which is provided with an outer convex cylindrical surface 21 that is spaced a uniform distance from the concave cylindrical surface 19. A plurality of radially extending blades or vanes 22 are mounted in any suitable manner in the body portion 20, as by being mounted in the recesses 23 provided in said body portion 20, as shown in FIG. 4. The main feeder may be provided with a pair of end members 24 that are mounted on the end members 7 in the manner shown in FIG. 3, and provided with upper and lower flanges 25 and 26, the upper flange 25 being provided with a shoulder for receiving the projecting flange portion 27 of the end member 7. The main feeder is mounted on the angle bracket 6 by means of bolts 28 that extend through a flange of the angle bracket 6 and through openings in a plate 29, which has a bracket portion 30 extending therefrom.

The particular details of structure of the rotary feeder can be varied, the important thing being that it is provided with a cylindrical feed chamber between the hopper 14 and the discharge opening 31 provided between the flaring walls 12 and the end walls 24, in which feed chamber the rotary feeding member having the body portion 20 and the vanes or blades 22, having their ends moving closely adjacent the concavely curved cylindrical wall 19, is provided.

The shaft 9 is driven through a suitable reduction gearing from the shaft 32 of an air motor 33 of the general character of the air motor shown for driving such a rotary feeding member in the application of Lyndus E. Harper, Serial No. 134,331, filed August 28, 1961, now abandoned, on High Accuracy Feeder. Said motor is mounted on the bracket 30, which extends from the plate 29. A suitable coupling 34 is provided between the motor shaft 32 and the reduction gearing. The air motor 33 drives the rotary feeding member having the body portion 20 in the direction indicated by the arrow thereon in FIG. 4. This will cause the material from the hopper 14 to be fed into the discharge passage 31 and the discharge spout 18 at a high rate of feed as long as the rotary feeding member is driven by the air motor 33.

Referring now to FIG. 5, a conduit 35 is shown therein, which is supplied with air under pressure from a suitable source, and is provided with a pair of branch lines 36 and 37. The line 36 is provided with a solenoid valve 38, which controls the supply of air under pressure to an air motor 41, which is provided with an air exhaust outlet 42 and is similar to the air motor 33. A solenoid valve 40 controls the supply of air under pressure in the branch line 37 to the air motor 33, which is provided with an air exhaust outlet 39. The air motor 41 is provided for a purpose to be described below.

Mounted below the discharge spout 18 is a receptacle or pan 43, which is mounted on a suitable weighing scale 44, provided with a main scalebeam 45 and a supplemental scalebeam 46, which may be provided, respectively, with sliding weights 47 and 48. The scalebeam 45 is provided with an extension 49 and the base of the weighing scale is provided with an upstanding bracket 50, upon which are mounted switches 51 and 52, which are provided with switch operating members 53 and 54, respectively, adapted to be engaged by the extending portion 49 of the scalebeam. The operating members 53 and 54 are preferably of such a character that very slight engagement therewith will actuate the same, being preferably of the character of microswitches. The switch 52 controls the operation of the solenoid valve 38 and the switch 51 controls the operation of the solenoid valve 40.

In FIG. 5 the switch 51 is shown as having a movable contact element 55, which is biased to normally engage the stationary contact element 56, and the switch 52 is provided wtih a movable contact element 57, which is normally biased to be disengaged from the stationary contact 58, with which it will be engaged by means of the scalebeam when the extension 49 engages the operating member 54. Similarly, when the scalebeam extension 49 engages the operating member 53, the operating member 53 will cause the movable contact 55 to be moved away from the stationary contact 56. The line wires 59 and 60 are provided and a branch conductor 61 extends from the line wire 59 to the movable contact element 57, while a conductor 62 extends from the stationary contact 58 to one terminal of the solenoid valve 38, a conductor 63 extending from the other terminal of said solenoid valve 38 to the line wire 60. Accordingly, when the movable contact member 57 engages the stationary contact member 58, the solenoid in the valve 38 will be energized, closing the normally open valve 38 and cutting off the supply of air under pressure to the air motor 41. A conductor 64 extends from the line wire 59 to the stationary contact 56 and a conductor 65 extends from the movable contact member 55 to one terminal of the solenoid valve 40, and a conductor 66 extends from the line wire 60 to the other terminal of the normally open solenoid valve 40.

While the switch operating members 53 and 54 are shown as being spaced rather widely from the operating end extension 49 of the scalebeam, to more clearly show the same, the actual position of said operating members in use is such that the operating member 53 will be engaged by the extension 49 until the scalebeam 45 begins to rise and the operating member 54 will be engaged by the scalebeam when it reaches its balanced position. The switches 51 and 52 are mounted on the bracket 50 so as to be adjustable vertically thereon in any desired manner to obtain this desired action of the switch operating members.

Accordingly, when the receptacle 43 is empty, the movable switching element 55 will be moved downwardly from the position shown in FIG. 5 by the action of the extension 49 of the scalebeam, and thus both operating circuits for the solenoid valves 38 and 40 will be opened and the valves will be opened, permitting flow of air under pressure to the air motors 33 and 41. The supply of air under pressure can be controlled by any suitable valve means to the conduit 35 so that the main air supply will only be provided for the two branch conduits 36 and 37 when it is desired to start a feeding operation. Any type of valve, manual, mechanical, or electrical, can be provided for this purpose.

Mounted on the flange 17 and the vertical wall of the discharge spout 18 and extending through an opening 67 in said vertical wall is a cylindrical housing 68, which is provided with an end wall 69 and a transverse wall 70, between which walls 69 and 70 a bearing member 71 is mounted for a shaft 72. The air motor 41 drives a shaft 73, which drives the shaft 72 through a reduction gearing mounted in the housing 74, said reduction gearing comprising a small gear 75 mounted on the shaft 73, a large gear 76 mounted on the counter shaft 77 to rotate therewith, a small gear 78 mounted on said counter shaft to rotate therewith, and a large gear 79 mounted on the shaft 72 to rotate therewith, the shaft 72 being rotated in a counter-clockwise direction as viewed in FIG. 4.

It will accordingly be seen that as the air motor 41 is driven when air under pressure is supplied thereto through the conduit 36 and the solenoid valve 38 the shaft 72 will be rotated at a low rate of speed. Mounted on the end of the shaft 72 to rotate therewith is a cylindrical mounting member 80. A helicoidal feed screw 81 is mounted on the mounting member 80, said helicoidal member being preferably square in cross section, as will be obvious from FIG. 4. The end turn 82 of said feed screw is secured to the outer cylindrical surface of the mounting member 80 in any suitable manner, as by means of welding as shown at 83. The feed screw 81 is mounted so as to be co-axial with the shaft 72 and to rotate about the axis of said shaft. The housing 68 has a trough-shaped semi-cylindrical portion 84 extending into the discharge spout 18, said semi-cylindrical portion constituting a trough-like receiving chamber for the material that is to be fed by the feed screw 81. It will be noted upon reference to FIG. 4 that the top edges 85 of said receiving chamber are horizontally aligned with the axis of rotation of the shaft 72. Thus the feed screw 81 has the upper half thereof externally of the trough-like U-shaped in cross section receiving chamber 84 and the lower half thereof operating in said receiving chamber.

The member 84 is open at the end 86 thereof and the rotation of the feed screw 81 in a counter-clockwise direction will cause the material in the trough-like member 84 to be discharged through the open end 86 thereof. Upon reference to FIG. 4, it will be seen that the trough-like member 84 is on the right hand side of the discharge spout 18 and thus there is a passage for material from the rotary main feeder through the discharge spout 18 that does not engage the trough-like member 84 or the feed screw 81 operating therein. However, due to the direction of rotation of the rotary feeding member of the rotary feeder the material discharged from the rotary feeder will be thrown somewhat to the right in the discharge passage 31 and thus into engagement with the trough-like member 84.

The feeding means is set into operation by supplying air under pressure to the conduit 35, setting the air motors 33 and 41 into operation. This is because the receptacle 43 will at this time be empty and the scalebeam will be depressed, opening the switch that has the movable contact 55, whereupon both switches will be open and both valves 38 and 40 will be open. The driving of the main feeder by the motor 33 will cause rapid discharge of material supplied from the hopper 14 through the discharge passage 31 and into the spout 18. Due to the rapid rate at which the material is being discharged by the rotary feeder, the trough-like member 84, even if almost empty, or completely empty, will be quickly filled with the material discharged by the rotary feeder. It will then remain filled up to the level of the top edges 85 of the semi-cylindrical trough-like member as the rotary feeder 81 will continuously be discharging the material from the trough-like member 84, both over the side edges 85 and the open end 86, to prevent any building up of the material in the trough-like member 84 above said top edges 85. This continues throughout the main feeding operation or period of operation of the rotary feeder driven by the air motor 33, said feeding operation consisting of feeding material directly from the rotary feeder into the receptacle 43 and from the supplemental feeder having the feed screw 81 to said receptacle 43.

When the scalebeam begins to rise, the contact 55 is engaged with the contact 56, energizing the solenoid in the valve 40, shutting off the supply of air under pressure to the air motor 33, and halting the main or rotary feeder. The screw feeder continues to operate, as the contact 57 is still held out of engagement with the contact 58, as the scalebeam is still below balanced position. However, then the scalebeam reaches its balanced position, the extension 49 thereon engages the switch operating member 54 and the contact 57 moves into engagement with the stationary contact 58, operating the solenoid valve 38 to energize the solenoid therein, closing the valve and cutting off the supply of air under pressure to the air motor 41 and halting the feed screw 81.

It is, of course, to be understood that the receiving trough 84 of the screw feeder is of such size and the adjustment of the switch operating member 54 is such that the material receiving member 84 will always be completely filled when the rotary or main feeder is halted in its operation by the rising of the scalebeam, and that said rotary or main feeder supplies an amount of material to the receptacle 43 such that the amount required to be fed by the screw feeder, to bring the weight of the material in the receptacle up to the desired amount, is less than the total capacity of the trough-like member 84.

What I claim is:

1. In a material feeding means a receptacle and means for feeding a predetermined weight of material to said receptacle comprising an upper feeder discharging material therefrom into said receptacle, a lower feeder comprising a trough U-shaped in cross section open at one end thereof in the path of material discharged from said upper feeder constructed and arranged to receive a portion of the material discharged by said upper feeder, a feed screw operating in said trough and extending upwardly above the top edges thereof to discharge material therefrom through said open end into said receptacle, and means responsive to the weight of material fed to said receptable to operate both said upper and lower feeders for a main feed period and only said lower feeder for an adidtional feed period.

2. In a material feeding means, a main feeder having a bottom discharge outlet, an open topped receptacle for said material below said outlet in downwardly spaced relation thereto, a supplemental feeder having an open topped U-shaped in cross section material receiving chamber between said discharge outlet and said receptacle, said chamber having an open end providing a discharge outlet over said receptacle, a feed screw in said chamber extending upwardly above the top edges thereof, and means for driving said feed screw to advance material in said chamber toward said open end of said chamber.

3. In a material feeding means, a main feeder having a bottom discharge outlet, an open topped receptacle for said material below said outlet in downwardly spaced relation thereto, a supplemental feeder having an open topped U-shaped in cross section material receiving chamber between said discharge outlet and said receptacle, said chamber having an open end providing a discharge outlet over said receptacle, a feed screw in said chamber extending upwardly above the top edges thereof, and means for driving said feed screw to advance material in said chamber toward said open end of said chamber, said supplemental feeder feeding at a much lower rate than said main feeder.

4. In a material feeding means, a main feeder having a bottom discharge outlet, an open topped receptacle for said material below said outlet in downwardly spaced relation thereto, a supplemental feeder having an open topped U-shaped in cross section material receiving chamber between said discharge outlet and said receptacle, said chamber having an open end providing a discharge outlet over said receptacle, a feed screw in said chamber extending upwardly above the top edges thereof, and means for driving said feed screw to advance material in said chamber toward said open end of said chamber, said supplemental feeder feeding at a much lower rate than said main feeder, and means responsive to the weight of material fed to said receptacle for controlling the operation of said feeders to operate said material advancing means after said main feeder has been halted.

5. In material feeding means, a low rate feeder comprising an elongated body portion U-shaped in cross section to provide an open topped chamber, mounting means for said body portion at one end thereof, said body portion being open at the other end thereof, a feed screw mounted in said body portion with its axis extending longitudinally of said body portion and with its ends adjacent the ends of said body portion, said feed screw extending upwardly above the top edges of said chamber, means for supplying said material to said body portion through the open top thereof, and means for driving said feed screw in a direction to advance material supplied to said body portion toward the open end thereof including a shaft connected with said feed screw to rotate therewith at the end thereof adjacent the end of said body portion provided with said mounting means.

6. In material feeding means, a receptacle for said material, a low rate feeder discharging into said receptacle, said low rate feeder comprising an elongated body portion U-shaped in cross section to provide an open topped chamber, mounting means for said body portion at one end thereof, said body portion being open at the other end thereof, a feed screw mounted in said body portion with its axis extending longitudinally of said body portion and with its ends adjacent the ends of said body portion, said feed screw extending upwardly above the top edges of said chamber, a high rate feeder supplying said material to said receptacle and to said body portion through the open top thereof, and means for driving said feed screw in a direction to advance material supplied to said body portion toward the open end thereof.

7. A feeder having an elongated body portion having an open end and a closed end and comprising an open topped trough portion semi-cylindrical in cross section extending over the major portion of the length of said body portion from said open end, a feed screw of approximately the same diameter as said trough portion mounted in said trough portion with its axis extending longitudinally of said body portion in coaxial relation to said trough portion, said feed screw being spaced from the wall of said trough portion and having its ends adjacent the ends of said trough portion, means above said trough portion for supplying material to be fed by said feeder to said trough portion through the open top thereof and means for driving said feed screw in a direction to advance the material supplied to said trough portion toward the open end thereof.

8. A feeder having an elongated body portion having an open end and a closed end and comprising an open topped trough portion semi-cylindrical in cross section extending over the major portion of the length of said body portion from said open end, and a tubular portion extending from said closed end thereof to said trough portion, a feed screw of approximately the same diameter as said trough portion mounted in said trough portion with its axis extending longitudinally of said body portion in coaxial relation to said trough portion, said feed screw being spaced from the wall of said trough portion and having its ends adjacent the ends of said trough portion, means above said trough portion for supplying material to be fed by said feeder to said trough portion through the open top thereof, a partition in said tubular portion adjacent one end of said feed screw, and means for driving said feed screw in a direction to advance the material supplied to said trough portion toward the open end thereof, comprising a shaft extending through said partition, an enlargement on said shaft mounting said feed screw to rotate with said shaft and a bearing for said shaft mounted in said tubular member between said closed end and said partition.

9. In a material feeding means, a main feeder comprising a feed chamber having transversely spaced cylindrical concave wall portions circumferentially spaced from each other to provide an upper material inlet to said chamber and a lower material outlet from said chamber, a rotary feeding member having a cylindrical body portion mounted in said chamber coaxially relative to said cylindrical wall portions and between the same, vanes extending radially from the body portion of said rotary member to said wall portions, means for rotating said feeding member about its axis in a predetermined direction, downwardly divergent walls extending from said feed chamber to provide a downwardly widening discharge passage leading from said material outlet, a discharge spout extending downwardly from said discharge passage, said rotary feeding member directing the material discharged therefrom toward one side of said discharge passage and spout, an open topped receptacle for said material in downwardly spaced relation to said spout and a supplemental feeder having a trough-like material receiving chamber mounted in said spout on the side thereof toward which said rotary feeding member directs said material, said trough-like chamber having an open end located in said spout over said receptacle, a feed screw mounted in said trough-like chamber and means for driving said feed screw in a direction to advance material deposited in said chamber toward said open end thereof, said feed screw extending upwardly above the top edges of said chamber.

10. The combination with a material feeding means of weighing means having a scalebeam, a receptacle for material to be weighed mounted on said weighing means, said material feeding means comprising a main feeder and a supplemental feeder, an air motor for independently driving each of said feeders, means between said air motors and said feeders for operating said main feeder at a predetermined rate of feed and said supplemental feeder at a much lower rate of feed, comprising speed reduction gearing between one of said air motors and said supplemental feeder, and means for controlling the operation of said feeders to discharge material from both thereof concurrently into said receptacle until a predetermined weight of material in said receptacle is approached and only from said supplemental feeder until a predetermined weight is reached comprising a switch operating member mounted on said scalebeam to move therewith, means for supplying air under pressure to said motors, a normally open solenoid valve controlling the supply of said air to the main feeder air motor, electric circuit connections including a switch controlling supply of electrical energy to said solenoid valve, said switch being biased toward circuit closing position and being engaged by said switch operating member to open said switch when said scalebeam is in a down position, a normally open solenoid valve controlling supply of air to the supplemental feeder motor and a switch controlling supply of electrical energy to said last mentioned solenoid valve, said switch being biased toward open circuit position and being engaged by said switch operating member to close said last mentioned switch upon said scalebeam rising to balanced position.

References Cited by the Examiner
UNITED STATES PATENTS

| | | | |
|---|---|---|---|
| 2,212,419 | 9/40 | Harmon | 177—120 |
| 2,303,628 | 12/42 | Geiger | 91—414 |
| 2,621,884 | 12/52 | Rhodes | 177—123 X |

LEYLAND M. MARTIN, *Primary Examiner.*

LEO SMILOW, *Examiner.*